(12) United States Patent
Gerstenberger et al.

(10) Patent No.: US 9,320,039 B2
(45) Date of Patent: Apr. 19, 2016

(54) METHOD AND ARRANGEMENT FOR USER EQUIPMENT SWITCHING BETWEEN CARRIERS IN DIFFERENT FREQUENCY BANDS

(75) Inventors: Dirk Gerstenberger, Stockholm (SE); Johan Bergman, Stockholm (SE)

(73) Assignee: Unwired Planet, LLC, Los Altos, CA (US)

( * ) Notice: Subject to any disclaimer, the term of this patent is extended or adjusted under 35 U.S.C. 154(b) by 718 days.

(21) Appl. No.: 13/126,244

(22) PCT Filed: Oct. 28, 2009

(86) PCT No.: PCT/SE2009/051226
§ 371 (c)(1),
(2), (4) Date: Apr. 27, 2011

(87) PCT Pub. No.: WO2010/050887
PCT Pub. Date: May 6, 2010

(65) Prior Publication Data
US 2011/0207495 A1    Aug. 25, 2011

Related U.S. Application Data

(60) Provisional application No. 61/110,146, filed on Oct. 31, 2008.

(51) Int. Cl.
*H04W 72/04* (2009.01)
*H04L 5/00* (2006.01)
*H04W 74/00* (2009.01)

(52) U.S. Cl.
CPC ......... *H04W 72/0453* (2013.01); *H04L 5/0094* (2013.01); *H04W 74/006* (2013.01); *H04L 5/0096* (2013.01); *H04W 72/0406* (2013.01)

(58) Field of Classification Search
CPC ... H04L 5/0053; H04L 1/1854; H04L 1/1887; H04L 1/0027; H04L 5/001; H04L 1/1861; H04L 5/0055; H04W 72/042; H04W 72/0406; H04W 72/048; H04W 72/10; H04W 72/1278; H04W 72/1294; H04W 72/14; H04W 74/00; H04W 74/006; H04W 72/0453; H04B 17/0077
See application file for complete search history.

(56) References Cited

U.S. PATENT DOCUMENTS

| | | | | |
|---|---|---|---|---|
| 2002/0172163 | A1* | 11/2002 | Chen et al. | 370/281 |
| 2004/0009767 | A1* | 1/2004 | Lee et al. | 455/422.1 |
| 2006/0030355 | A1 | 2/2006 | Kemmochi et al. | |
| 2006/0203780 | A1* | 9/2006 | Terry | 370/335 |
| 2006/0291403 | A1* | 12/2006 | Kahtava et al. | 370/252 |

(Continued)

FOREIGN PATENT DOCUMENTS

| | | |
|---|---|---|
| CN | 101277496 A | 10/2008 |
| EP | 1283600 A1 | 2/2003 |

(Continued)

OTHER PUBLICATIONS

PCT International Search Report, mailed Feb. 22, 2010, in connection with International Application No. PCT/SE2009/051226.

(Continued)

*Primary Examiner* — Alejandro Rivero
(74) *Attorney, Agent, or Firm* — Nixon & Vanderhye P.C.

(57) ABSTRACT

Method and arrangement in a base station for scheduling communication between the base station and a user equipment in a multi-carrier communication network system. The base station and the user equipment are comprised in the multi-carrier communication network system, and adapted to communicate with each other on downlink carriers and uplink carriers in at least a first frequency band and a second frequency band over a radio interface. The method comprises signalling an indication to the user equipment on the downlink carrier in the first frequency band, which the user equipment currently is scheduled on, to switch to a second carrier in order to communicate data and/or control signalling on the second carrier. In addition, a method and arrangement in a user equipment for assisting the base station in scheduling radio resources are described.

9 Claims, 7 Drawing Sheets

(56) References Cited

U.S. PATENT DOCUMENTS

| | | | | |
|---|---|---|---|---|
| 2007/0223611 | A1* | 9/2007 | Ode et al. | 375/260 |
| 2009/0201871 | A1* | 8/2009 | Sambhwani et al. | 370/329 |
| 2009/0316575 | A1* | 12/2009 | Gholmieh | H04W 76/048 370/225 |
| 2010/0222059 | A1* | 9/2010 | Pani | H04W 72/0453 455/436 |

FOREIGN PATENT DOCUMENTS

| | | |
|---|---|---|
| EP | 1677478 A2 | 7/2006 |
| EP | 1816666 A1 | 8/2007 |
| WO | 2006085139 A2 | 8/2006 |
| WO | 2007112724 A1 | 10/2007 |
| WO | 2009087438 A1 | 7/2009 |

OTHER PUBLICATIONS

PCT Written Opinion, mailed Feb. 22, 2010, in connection with International Application No. PCT/SE2009/051226.

International Preliminary Report on Patentability, mailed Feb. 22, 2010, in connection with International Application No. PCT/SE2009/051226.

ETSI TS 125 331 V8.3.1 Universal Mobile Telecommunications System (UMTS); Radio Resource Control (RRC); Protocol specification (3GPP TS 25.331 version 8.3.1 Release 8), Oct. 2008, 102 pages.

ETSI TS 125 101 V8.8.0 Universal Mobile Telecommunications System (UMTS); User Equipment (UE) radio transmission and reception (FDD) (3GPP TS 25.101 version 8.8.0 Release 8), Oct. 2009, 14 pages.

* cited by examiner

METHOD AND ARRANGEMENT FOR USER EQUIPMENT SWITCHING BETWEEN CARRIERS IN DIFFERENT FREQUENCY BANDS

CROSS-REFERENCE TO RELATED APPLICATIONS

This application is the U.S. national phase of International Application No. PCT/SE2009/051226, filed Oct. 28, 2009, which designated the U.S. and claims the benefit of U.S. Provisional Application No. 61/110,146, filed Oct. 31, 2008.

TECHNICAL FIELD

The present invention relates to a method and arrangement in a base station and a method and arrangement in a user equipment. More in particular, it relates to a mechanism for scheduling communication between the base station and the user equipment in a multi-carrier communication network system.

BACKGROUND

Operation of Wideband Code Division Multiple Access (WCDMA) and/or High Speed Packet Data Access (HSPA) on multiple 5 MHz frequency blocks, or carriers as they also may be referred to, is one further step of evolving WCDMA and HSPA. This mode of operation is often referred to as Multi Carrier WCDMA or Multi Carrier HSPA, in the following referred to as "multi carrier HSPA".

A multi carrier (MC) arrangement with Frequency Division Duplex (FDD) can be described as a set of downlink carriers linked to a set of uplink carriers. The downlink carriers can be adjacent or non-adjacent in the frequency domain, and the same holds for the uplink carriers. More general, carriers do not need to be in the same band and Time Division Duplex (TDD) bands could also be used as part of the multi carrier operation.

The multi carrier arrangements can also be such that the number of downlink carriers is different from the number of uplink carriers.

One concept to arrange the uplink and downlink carriers in a multi carrier system would be to define an anchor (A) carrier in uplink and downlink. The remaining carriers, both uplink and downlink carriers, in the multi carrier system can be referred to as non-anchor (NA) carriers. For example, most of the control signalling can be carried on the anchor carrier, while the non-anchor carriers carry only the data channels and necessary control signalling channels that cannot be carried on the anchor carrier.

For example, two 5 MHz downlink carriers can be placed as one carrier in the 850 MHz band and one carrier in the 1900 MHz band respectively. For the case when the downlink carriers are in multiple bands, the user equipment (UE) needs to have support for receiving signals on two downlink bands simultaneously.

The uplink may reside in either of the bands or even transmission on two uplinks is possible. Similar to the downlink, the user equipment needs to have support for transmitting signals on two uplink bands simultaneously.

Support for receiving or transmitting signals simultaneously on two bands is very costly for a user equipment implementation, as it requires doubled Radio Frequency (RF) chains. Also, the simultaneous signalling over two or more bands is energy consuming.

The same problems are valid for multicarrier configurations in more than two bands.

SUMMARY

It is the object of embodiments of the invention to obviate at least some of the above disadvantages and provide an improved performance within a multi-carrier communication network system.

According to a first aspect, the object is achieved by a method in a base station for scheduling communication between the base station and a user equipment in a multi-carrier communication network system. The base station and the user equipment are adapted to communicate on a first downlink carrier in a first frequency band, and on a second carrier over a radio interface. The second carrier is either a second downlink carrier on a second frequency band or an uplink carrier on either the first frequency band or the second frequency band. The method comprises signalling an indication to the user equipment on the first downlink carrier in the first frequency band, on which the user equipment currently is scheduled, to switch to the second carrier. The switch is to be made in order to communicate data and/or control signalling on the second carrier. Also, the method comprises communicating data and/or control signalling with the user equipment on the second carrier, thereby performing the switch.

According to a second aspect, the object is also achieved by an arrangement in a base station for scheduling communication between the base station and a user equipment in a multi-carrier communication network system. The base station and the user equipment are adapted to communicate on a first downlink carrier in a first frequency band and a second carrier over a radio interface. The second carrier is either a second downlink carrier on a second frequency band or an uplink carrier on either the first frequency band or the second frequency band. The arrangement comprises a communication unit. The sending unit is adapted to signal an indication to the user equipment on the first downlink carrier in a first frequency band, which the user equipment currently is scheduled on, to switch to the second carrier. The switch is to be made in order to communicate data and/or control signalling on the second carrier. The communication unit is further adapted to communicate data and/or control signalling with the user equipment on the second carrier.

According to a third aspect, the object is also achieved by a method in a user equipment for assisting a base station in scheduling communication between the base station and a user equipment in a multi-carrier communication network system. The base station and the user equipment are adapted to communicate on a first downlink carrier in a first frequency band and a second carrier over a radio interface. The second carrier is either a second downlink carrier on a second frequency band or an uplink carrier on either the first frequency band or the second frequency band. The method comprises receiving an indication from the base station on the first downlink carrier in the first frequency band, on which the user equipment currently is scheduled, to switch to the second carrier. The switch is to be made in order to communicate data and/or control signalling on the second carrier. The method also comprises switching to communicate data and/or control signalling on the second carrier.

According to a fourth aspect, the object is also achieved by an arrangement in a user equipment for assisting a base station in scheduling communication between the base station and a user equipment in a multi-carrier communication network system. The base station and the user equipment are adapted to communicate on a first downlink carrier in a first frequency band and a second carrier over a radio interface. The second carrier is either a second downlink carrier on a second frequency band or an uplink carrier on either the first frequency band or the second frequency band. The arrangement comprises a receiving unit. The receiving unit is adapted to receive an indication from the base station on the first downlink carrier in the first frequency band, on which the user equipment currently is scheduled, to switch to the second carrier. The switch of carriers is to be performed in order to communicate data and/or control signalling on the second carrier. The arrangement also comprises a switching unit. The switching unit is adapted to switch to communicate data and/or control signalling on the second carrier.

According to a fifth aspect, the object is also achieved by a computer program product. The computer program product is stored on a computer readable medium, and it is further adapted to perform the steps according to the method in a base station as described above, when run on a processing unit.

By controlling, in a dynamic way, according to the present methods and arrangements on which carrier and/or which band the user equipment shall communicate data, the user equipment can be switched quickly between two or more bands by means of a band switch command sent on the downlink on a carrier in a band on which the user equipment is currently scheduled on.

Thus, by dynamically switching the user equipment between carriers and/or bands it is possible to significantly reduce the user equipment receiver and/or transmitter complexity and power consumption due to the fact that only one receiver/transmitter RF chain is required. Thereby the user equipment receiver and/or transmitter complexity is reduced, rendering simpler design and fewer parts, leading to lower production costs. Also, the power consumption of the base station and user equipment is reduced, which render lower costs and prolonged standby/conversation time in particular for the user equipment. Also, by transmitting alternately on one receiver/transmitter RF chain at the time, mutual interference between the two or more bands is avoided. Thus an improved performance within a multi-carrier communication network system is provided.

Other objects, advantages and novel features of the invention will become apparent from the following detailed description of the invention.

BRIEF DESCRIPTION OF THE DRAWINGS

The present invention will now be described more in detail in relation to the enclosed drawings, in which.

DETAILED DESCRIPTION

The invention is defined as a method and an arrangement in a base station and as a method and an arrangement in a user equipment, which may be put into practice in the embodiments described below. This invention may, however, be embodied in many different forms and may not be construed as limited to the embodiments set forth herein; rather, these embodiments are provided so that this disclosure will be thorough and complete, and will fully convey the scope of the invention to those skilled in the art. It is to be understood that there is no intent to limit the present methods and/or arrangements to any of the particular forms disclosed, but on the contrary, the present methods and arrangements are to cover all modifications, equivalents, and alternatives falling within the scope of the invention as defined by the claims.

Figure 1:
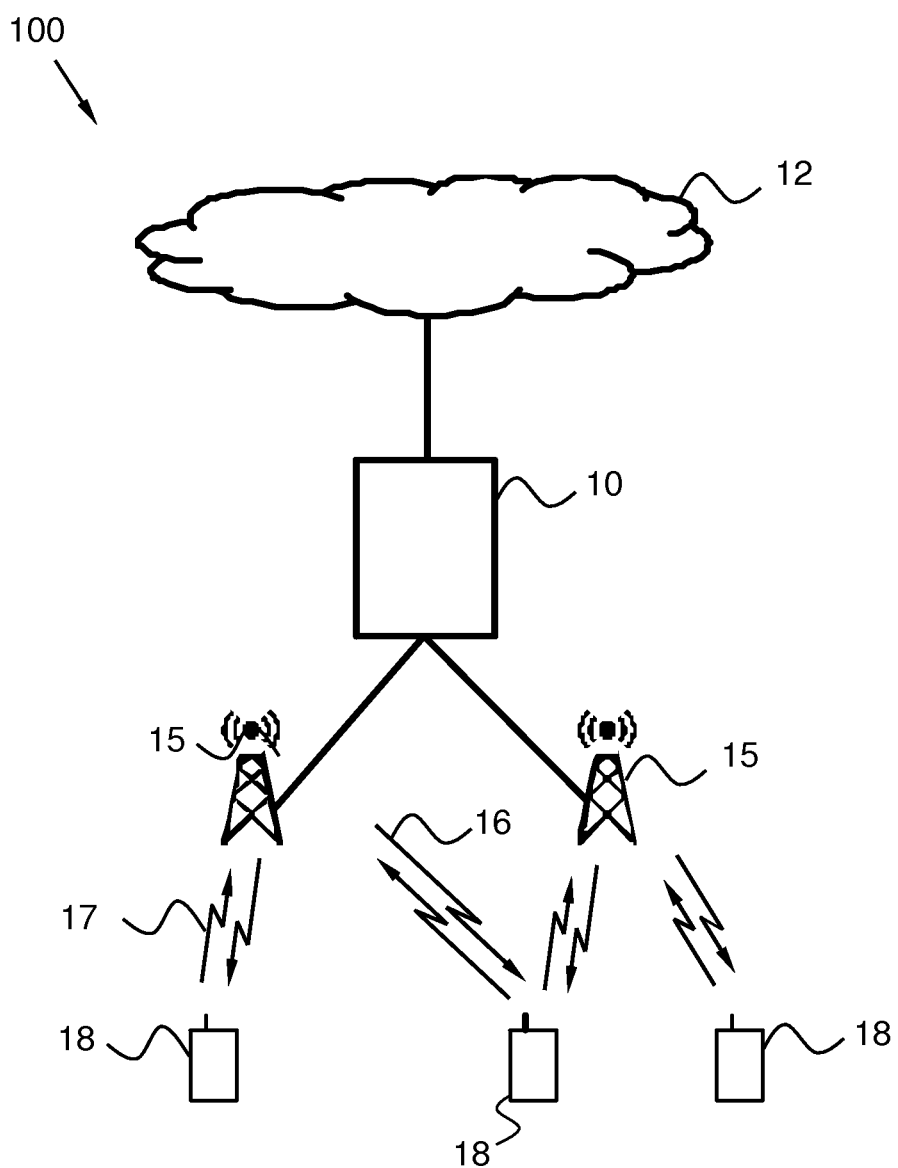
FIG. 1 is a schematic block diagram illustrating an exemplary multi-carrier communication network system.

FIG. 1 is a schematic illustration over a multi-carrier communication network system 100. The multi-carrier communication network system 100 may comprise a Radio Access Network (RAN), such as e.g. the UMTS Terrestrial Radio Access Network (UTRAN) architecture. Further, the multi-carrier communication network system 100 comprises at least one base station 15. Two base stations 15 are depicted in FIG. 1, however, it is to be understood that another configuration of base station transceivers may be connected through, for example, other network nodes, to define the multi-carrier communication network system 100. Further, the base station 15 may be referred to as e.g. a Remote Radio Unit, an access point, a Node B, an evolved Node B (eNode B or eNB) and/or a base transceiver station, a Radio Base Station (RBS), Access Point Base Station, base station router, etc depending e.g. of the radio access technology and terminology used.

The base station 15 may be connected to one or more Radio Network Controllers (RNCs) 10, depending on the used technology and network architecture. The multi-carrier communication network system 100 is further arranged to comprise at least one user equipment 18. The base station 15 may send and receive wireless signals to and from the user equipment 18 situated within the cell. In some embodiments, the user equipment 18 may be represented by and/or referred to as a wireless communication device, a wireless communication terminal, a mobile telephone, a cellular telephone, a terminal, a Personal Communications Systems terminal, a Personal Digital Assistant (PDA), a laptop with mobile termination, computer or any other kind of device capable of managing radio resources that may be for example, a portable, a pocket, a hand-held, a computer-included or a vehicle-mounted mobile device which is adapted to communicate voice and/or data with the base station 15.

The multi-carrier communication network system 100 further comprises a Core Network (CN) 12. Thereby the RAN and the core network 12 provide communication and control for a plurality of user equipments 18 that each uses downlink (DL) channels 16 and uplink (UL) channels 17. For the reason of clarity, only one uplink channel is denoted 17 and one downlink channel denoted 16 in FIG. 1. On the downlink channel 16, the base station 15 transmits to each user equipment 18 at respective power level. On the uplink channel 17, the user equipments 18 transmit data to the base station 15 at respective power level.

The multi-carrier communication network system 100 may be based on technologies such as e.g. Global System for Mobile Telecommunications (GSM), Enhanced Data rates for GSM Evolution (EDGE), General Packet Radio Service (GPRS), Code Division Multiple Access (CDMA), Wideband Code Division Multiple Access (WCDMA), CDMA 2000, High Speed Downlink Packet Data Access (HSDPA), High Speed Uplink Packet Data Access (HSUPA), High Data Rate (HDR), High Speed Packet Data Access (HSPA), Universal Mobile Telecommunications System (UMTS), Wireless Local Area Networks (WLAN), such as Wireless Fidelity (WiFi) and Worldwide Interoperability for Microwave Access (WiMAX), Bluetooth etc, just to mention some few arbitrary and none limiting examples.

However, in the exemplary embodiments in the subsequent description, the multi-carrier communication network system 100 is based on a HSPA communication system. However, it is realized that the present methods and arrangements work very well on other communications systems as well, such as WCDMA, LTE or LTE Advanced.

The user equipment 18 may further communicate with other terminals not shown in FIG. 1, via the base station 15 comprised within the multi-carrier communication network system 100.

The present methods and arrangements describe mechanisms and arrangements to control, in a dynamic way, on which band the user equipment 18 shall communicate data. The user equipment 18 may be switched quickly between two or more bands by means of a band switch command sent on the downlink 16 which the user equipment 18 is currently scheduled on. The same principle may be applied both for the downlink 16 and for the uplink 17.

In the following, the principle is illustrated for the exemplary case of two downlink carriers where one downlink carrier is placed on one band each. It is also assumed in the illustrated exemplary embodiment, that there is only one uplink 17, associated to one of the downlink bands, as will be further explained more in detail in connection with the presentation of FIG. 2a and FIG. 2b.

Figure 2A:
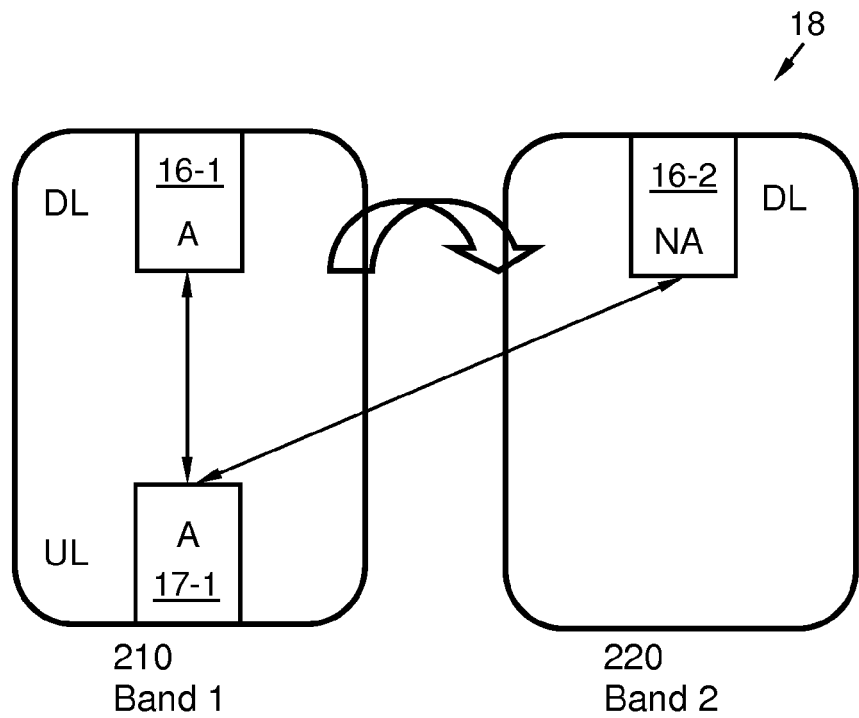
FIG. 2a is a schematic block diagram illustrating an embodiment of the present invention showing a user equipment comprising two downlink carriers and one uplink carrier, wherein the user equipment shall switch to receive data on the non-anchor downlink carrier.

FIG. 2a illustrates an exemplary embodiment of the present solution. A user equipment 18 comprises two downlink carriers 16-1, 16-2 and one uplink carrier 17-1. The uplink carrier 17-1 and one of the downlink carriers 16-1 are placed on a first band 210 while the second downlink carrier 16-2 is situated on a second band 220. In the illustrated exemplary embodiment, the uplink carrier 17-1 and the first of the downlink carriers 16-1 placed on the first band 210 are anchor carriers. The second downlink carrier 16-2 on the second band 220 is non anchor carrier. Just to mention a non-limiting example, the first band 210 may be a 850 MHz band while the second band 220 may be 1900 Mhz. The two downlink carriers 16-1, 16-2 may be e.g. two 5 MHz downlink carriers.

In the exemplary embodiment, the user equipment 18 is transmitting uplink and downlink transmissions over the first band 210 but switch to receive data on the non-anchor downlink carrier 16-2 on the second band 220.

When the user equipment 18 is receiving data and/or control signalling on the anchor downlink carrier 16-1, an indication is signalled from the base station 15 on the anchor downlink carrier 16-1 that the user equipment 18 shall switch to receive data and/or control on the non-anchor downlink carrier 16-2.

Such an indication can be signalled from the base station 15 to the user equipment 18 in several different ways, for example using a High Speed Shared Control Channel (HS-SCCH) order, sent on the anchor carrier 16-1, according to some embodiments.

However, according to some embodiments, the indication may be signalled from the base station 15 to the user equipment 18 by using implicit signalling through the Transport Format Resource Combination (TFRC) on the anchor carrier 16-1.

According to still some embodiments the indication to switch to receiving data and/or control on the non-anchor downlink carrier 16-2 may be signalled from the base station 15 to the user equipment 18 by sending a band switch command into the HS-SCCH on the anchor carrier 16-1.

Figure 2B:
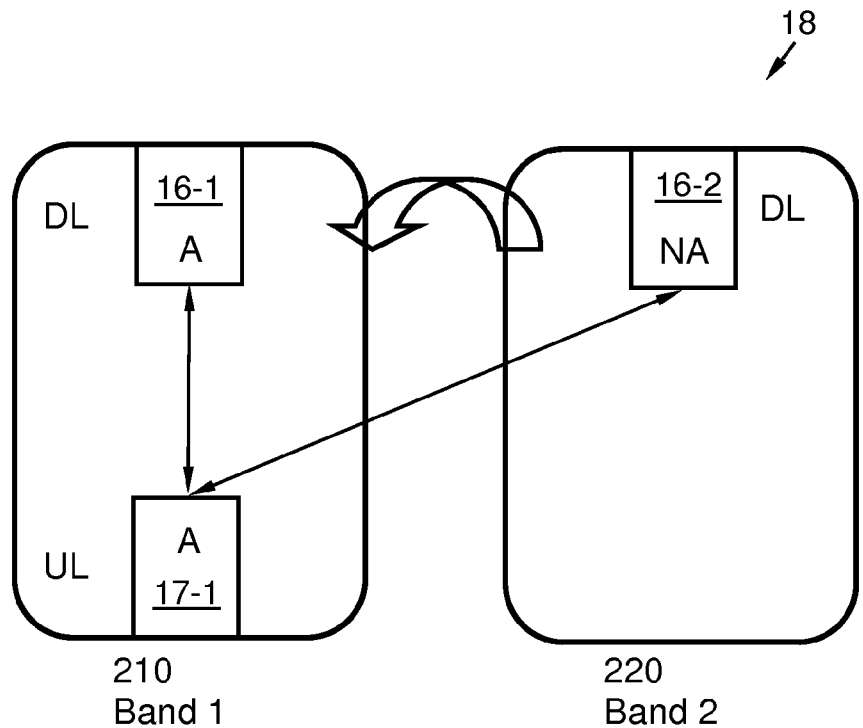
FIG. 2b is a schematic block diagram illustrating an exemplary embodiment of the present invention showing a user equipment comprising two downlink carriers and one uplink carrier, wherein the user equipment shall switch to receive data on the anchor downlink carrier.

FIG. 2b illustrates an exemplary embodiment of the present solution. A user equipment 18 comprises two downlink carriers 16-1, 16-2 and one uplink carrier 17-1. The uplink carrier 17-1 and one of the downlink carriers 16-1 are placed on a first band 210 while the other downlink carrier 16-2 is situated on a second band 220. In the illustrated exemplary embodiment, the uplink carrier 17-1 and the first of the downlink carriers 16-1 placed on the first band 210 are anchor carriers. The second downlink carrier 16-2 on the second band 220 is a non-anchor carrier. The uplink transmission is performed over the first band 210 while the downlink transmission is performed over the non-anchor downlink carrier 16-2 on the second band 220.

When the user equipment 18 is receiving data and/or control signalling from the base station 15 on the non-anchor downlink carrier 16-2, an indication is signalled on the non-anchor downlink carrier 16-2 that the user equipment 18 shall switch to receive data and/or control on the anchor downlink carrier 16-1 in the first band 210.

Such an indication can be signalled from the base station 15 to the user equipment 18 in several different ways, for example using a High Speed Shared Control Channel (HS-SCCH) order, sent on the non-anchor carrier 16-2, according to some embodiments.

However, according to some embodiments, the indication may be signalled from the base station 15 to the user equipment 18 by using implicit signalling through the Transport Format Resource Combination (TFRC) on the non-anchor carrier 16-2.

According to still some embodiments the indication to switch to receiving data and/or control on the non-anchor downlink carrier 16-2 may be signalled from the base station 15 to the user equipment 18 by sending a band switch command into the HS-SCCH on the non-anchor carrier 16-2.

However, according to some embodiments, a criterion for switching from the non-anchor carrier 16-2 back to the anchor carrier 16-1 may be the expiration of a timer with a predefined, configured or signalled timer value, rather than an indication on the non-anchor downlink carrier 16-2. The timer may be e.g. a count down timer, which may be preset to count down from a predetermined time value before switching from the non-anchor carrier 16-2 to the anchor carrier 16-1.

Figure 3A:
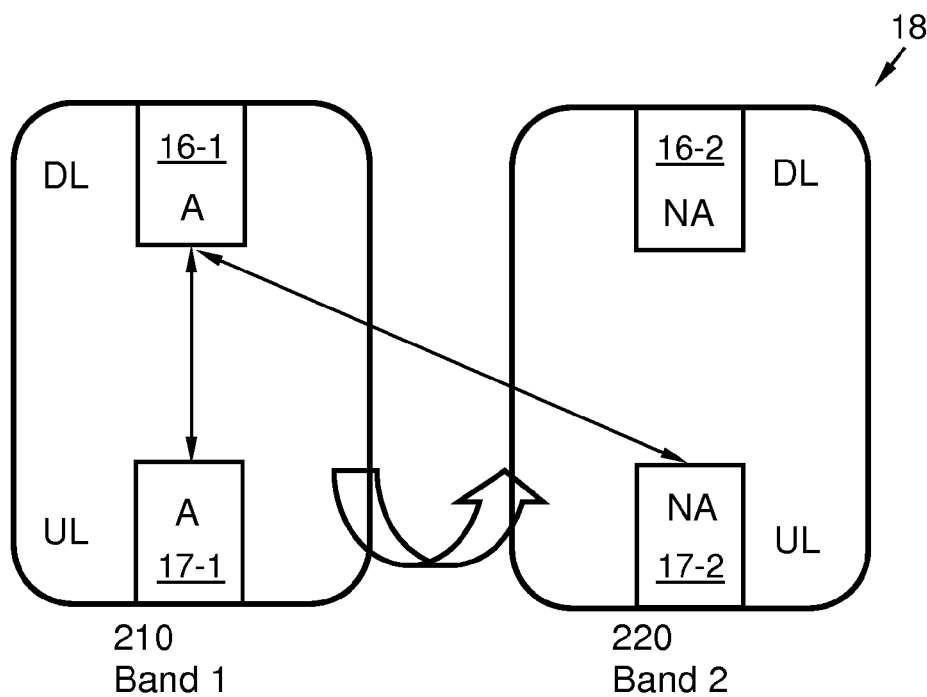
FIG. 3a is a schematic block diagram illustrating an exemplary embodiment of the present invention showing a user equipment comprising two downlink carriers and two uplink carriers, wherein the user equipment shall switch the uplink band.

FIG. 3a illustrates an exemplary embodiment of the present solution comprising multiple uplink carriers placed 17-1, 17-2 on different bands 210, 220. A user equipment 18 may comprise two downlink carriers 16-1, 16-2 and two uplink carriers 17-1, 17-2. The first uplink carrier 17-1 and the first downlink carrier 16-1 may be placed on a first band 210 while the second uplink carrier 17-2 and second downlink 16-2 carrier may be situated on a second band 220. In the illustrated exemplary embodiment, the first uplink carrier 17-1 and the first downlink carrier 16-1 placed on the first band 210 are anchor carriers. The carriers 16-2, 17-2 on the second band 220 are non-anchor carriers. The uplink and downlink transmission is performed over the anchor carriers 16-1, 17-1 on the first band 210.

In the scenario depicted in FIG. 3a, comprising multiple uplink carriers 17-1, 17-2 placed on different bands 210, 220 an indication to switch the uplink band from the first band 210 to the second band 220 may be sent from the base station 15 to the user equipment 18.

According to some embodiments, the indication can also be used to indicate a change of downlink anchor carrier and/or uplink anchor carrier so that the anchor carrier(s) are always in the received/transmitted band.

Figure 3B:
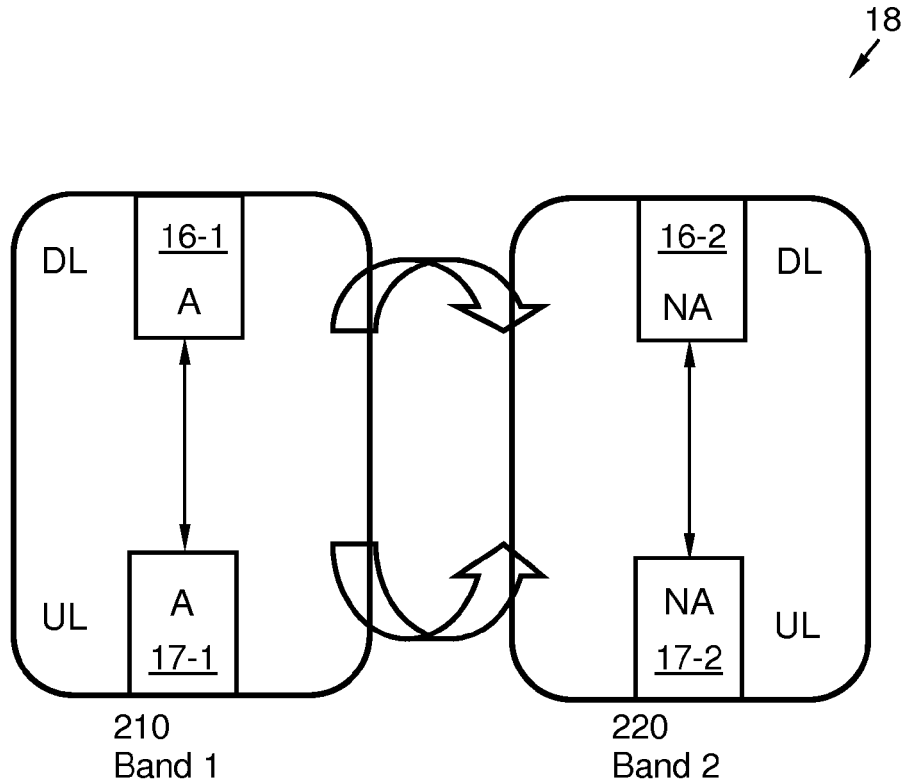
FIG. 3b is a schematic block diagram illustrating an exemplary embodiment of the present invention showing a user equipment comprising two downlink carriers and two uplink carriers, wherein the user equipment automatically switches the uplink band when it switches the downlink band.

FIG. 3b illustrates an exemplary embodiment of the present solution comprising multiple uplink carriers 17-1, 17-2 placed on different bands 210, 220. A user equipment 18 may comprise two downlink carriers 16-1, 16-2 and two uplink carriers 17-1, 17-2. The first downlink carrier 16-1 and the first uplink carrier 17-1 may be placed on a first band 210 while the second downlink carrier 16-2 and second uplink carrier 17-2 may be situated on a second band 220. In the illustrated exemplary embodiment, the first uplink carrier 17-1 and the first downlink carrier 16-1 placed on the first band 210 are anchor carriers. The carriers 16-2, 17-2 on the second band 220 are non-anchor carriers. The uplink and downlink transmission may be performed over the anchor carriers 16-1, 17-1 on the first band 210, respectively.

In the scenario depicted in FIG. 3b, comprising multiple uplink carriers 17-1, 17-2 placed on different bands 210, 220 the uplink band may be switched from the first band 210 to the second band 220 automatically, when an indication to switch downlink band from the first band 210 to the second band 220 is received from the base station 15.

According to some embodiments, the reception of the indication may be acknowledged by the user equipment 18 by transmitting an acknowledgement ACK on HS-DPCCH in uplink 17, either before the frequency change is performed or after it has been performed.

Thus an ACK, acknowledging the switch from the first band 210 to the second band 220 may be sent either on the first uplink carrier 17-1 on the first band 210 before performing the switch of uplink carriers 17-1, 17-2, or on the second uplink carrier 17-2 on the second band 220, after having performed the switch, according to some embodiments.

The present methods and arrangements may be generalized to more than two bands 210, 220.

Figure 4:
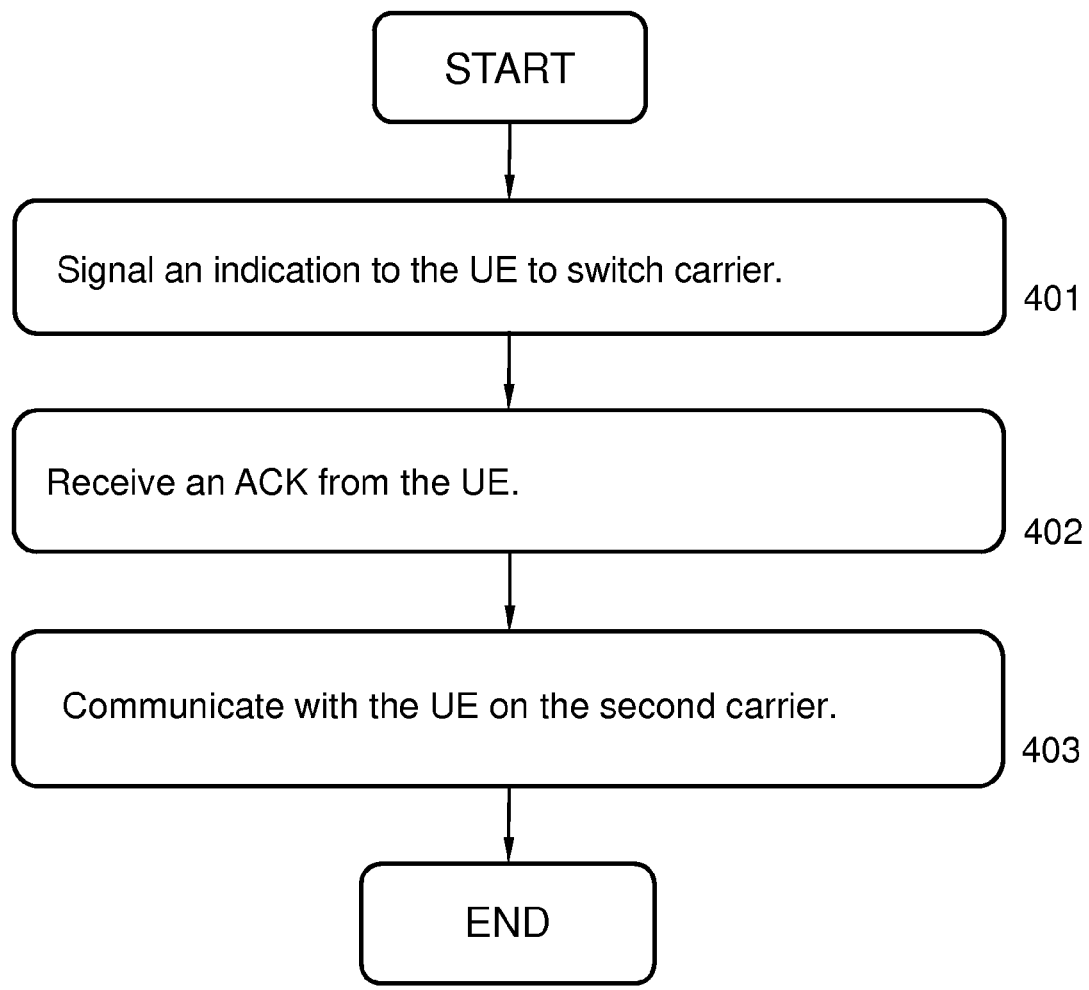
FIG. 4 is a flow chart illustrating embodiments of method steps in a base station.

FIG. 4 is a flow chart illustrating embodiments of method steps 401-403 performed in a base station 15. The method aims at scheduling communication between the base station 15 and a user equipment 18 in a multi-carrier communication network system 100. The base station 15 and the user equipment 18 are comprised in the multi-carrier communication network system 100. Further, the base station 15 and the user equipment 18 are adapted to communicate on a first downlink carrier 16-1 in a first frequency band 210 and on a second carrier 16-2, 17-1, 17-2 over a radio interface. The second carrier 16-2, 17-1, 17-2 may be a second downlink carrier 16-2 in a second frequency band 220, according to some embodiments. Alternatively, according to some embodiments, the second carrier 16-2, 17-1, 17-2 may be an uplink carrier 17-2 in the second frequency band 220, or an uplink carrier 17-1 in the first frequency band 210.

To appropriately schedule communication between the base station 15 and the user equipment 18, the method may comprise a number of method steps 401-403.

It is however to be noted that some of the described method steps 401-403 are optional and only comprised within some embodiments. Further, it is to be noted that the method steps 401-403 may be performed in a somewhat different chronological order. The method may comprise the following steps:

Step 401

An indication is signalled to the user equipment 18 on the first downlink carrier 16-1 in the first frequency band 210, which the user equipment 18 currently is scheduled on. The indication indicates that the user equipment 18 is to switch to the second carrier 16-2, 17-1, 17-2. The switch is to be performed in order to communicate data and/or control signalling on the second carrier 16-2, 17-1, 17-2.

According to some embodiments, the indication indicates that the user equipment 18 is to switch to the second downlink carrier 16-2 in the second frequency band 220. The switch is to be performed in order to receive data and/or control signalling on the second downlink carrier 16-2 in the second frequency band 220.

The indication may be signalled to the user equipment 18 by using a High Speed Shared Control Channel (HS-SCCH) order, according to some embodiments.

However, the indication may according to some embodiments be signalled to the user equipment 18 by using implicit signalling through a Transport Format Resource Combination (TFRC).

The indication signalled to the user equipment 18, to switch to the second downlink carrier 16-2 in the second frequency band 220 may also comprise, according to some embodiments, an indication to switch to an uplink carrier 17-2 in the second frequency band 220.

Step 402

This step is optional and may only be performed within some embodiments.

An acknowledgement ACK is received from the user equipment 18 before any downlink data and/or control signalling is communicated with the user equipment 18 on the second carrier 16-2, 17-1, 17-2.

According to some embodiments, an acknowledgement ACK may be received from the user equipment 18 before any downlink data and/or control signalling may be sent to the user equipment 18 on the second downlink carrier 16-2 in the second frequency band 220.

Step 403

Data and/or control signalling are communicated with the user equipment 18 on the second carrier 16-2, 17-1, 17-2.

According to some embodiments, data and/or control signalling are signalled to the user equipment 18 on the second downlink carrier 16-2 in the second frequency band 220.

Thus all data and control signalling may be sent to the user equipment 18 on the second downlink carrier 16-2 in the second frequency band 220 while the on the first downlink carrier 16-1 in the first frequency band 210 is idle, after the switch, according to some embodiments.

Figure 5:
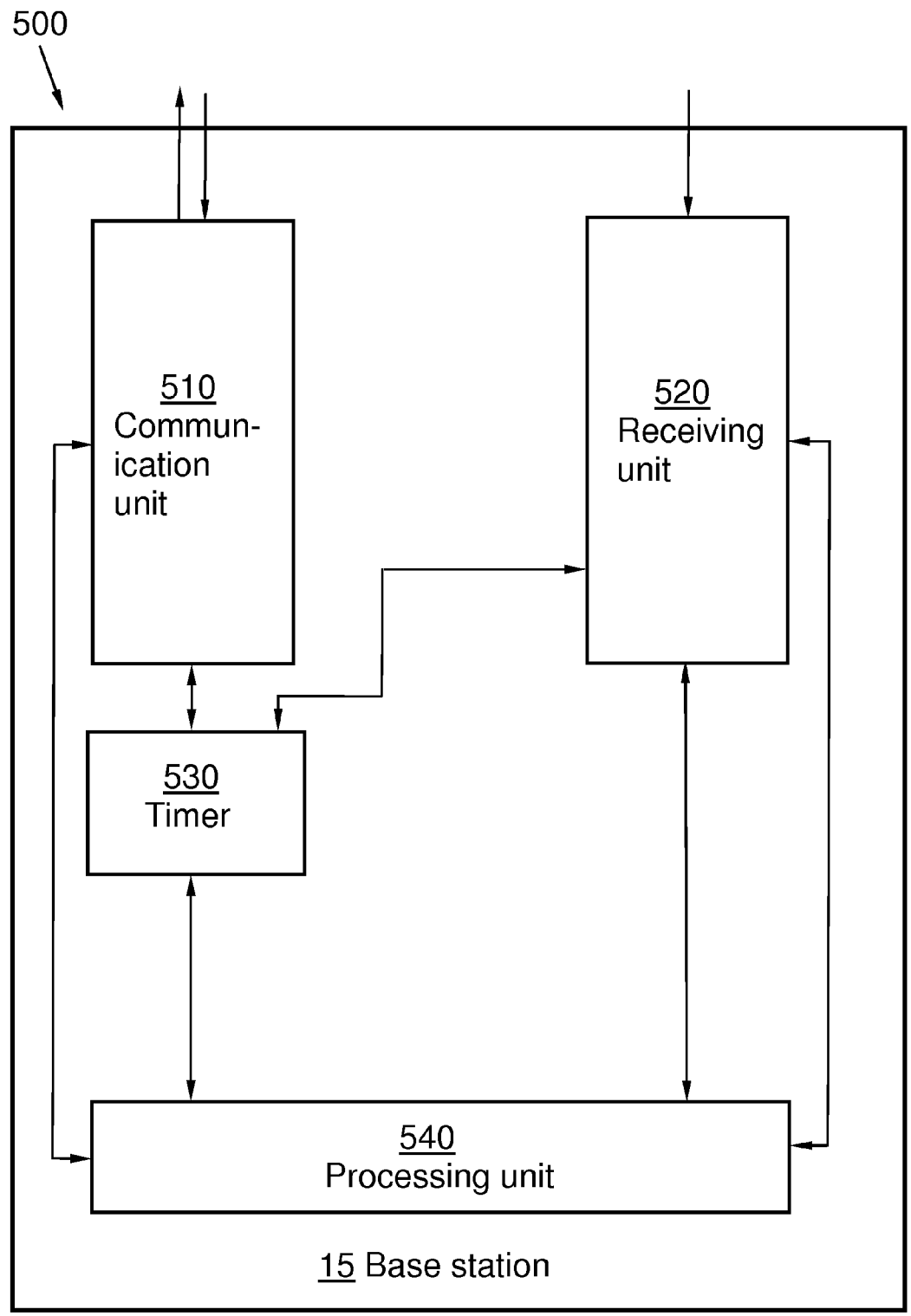
FIG. 5 is a block diagram illustrating embodiments of an arrangement in a base station.

FIG. 5 is a block diagram illustrating embodiments of an arrangement 500 situated in a base station 15 for scheduling communication between the base station 15 and a user equipment 18 in a multi-carrier communication network system 100. The arrangement 500 is configured to perform the method steps 401-403 for scheduling communication between the base station 15 and the user equipment 18. The base station 15 and the user equipment 18 are comprised in the multi-carrier communication network system 100. The base station 15 and the user equipment 18 are adapted to communicate on a first downlink carrier 16-1 in a first frequency band 210 and on a second carrier 16-2, 17-1, 17-2 over a radio interface. The second carrier 16-2, 17-1, 17-2 may be a second downlink carrier 16-2 in a second frequency band 220, according to some embodiments. Alternatively, according to some embodiments, the second carrier 16-2, 17-1, 17-2 may be an uplink carrier 17-2 in the second frequency band 220, or an uplink carrier 17-1 in the first frequency band 210.

For the sake of clarity, any internal electronics of the arrangement 500, not completely necessary for understanding the present method has been omitted from FIG. 5.

The arrangement 500 comprises a communication unit 510. The communication unit 510 is adapted to send an indication to the user equipment 18 on the first downlink carrier 16-1 in a first frequency band 210, which the user equipment 18 currently is scheduled on, to switch to the second carrier 16-2, 17-1, 17-2. The switch is to be performed in order to communicate data and/or control signalling on the second carrier 16-2, 17-1, 17-2.

According to some embodiments, the communication unit 510 is further adapted to send an indication indicating that the user equipment 18 is to switch to the second downlink carrier 16-2 in the second frequency band 220. The switch is to be performed in order to receive data and/or control signalling on the second downlink carrier 16-2 in the second frequency band 220.

Thereby, after the switch, all data and control signalling may be communicated with the user equipment 18 on the second carrier 16-2, 17-1, 17-2 while the first downlink carrier 16-1 in the first frequency band 210 is idle, according to some embodiments.

Further, the communication unit 510 is further adapted to communicate all data and/or control signalling to the user equipment 18 on the second downlink carrier 16-2 in the second frequency band 220.

The arrangement 500 may optionally comprise, according to some embodiments, a receiving unit 520. The receiving unit 520 may be adapted to receive an acknowledgement ACK from the user equipment 18, before any downlink data and/or control signalling is communicated with the user equipment 18 on the second carrier.

The arrangement 500 may optionally further comprise a time offset suppressing timer 530. The optional timer 530 may be adapted to switch back from a first carrier 16-1, 17-1 e.g. a non-anchor carrier to a second carrier 16-2, 17-2 e.g. an anchor carrier, when the timer 530 has timed out. The timer 530 may function as a count down timer, counting down from a specified time interval. According to some embodiments, the specified time interval may be preset to a predetermined and/or configured value. Alternatively, the timer value may be signalled from the base station 15, according to some embodiments.

The arrangement 500 may according to some embodiments further comprise a processing unit 540. The processing unit 540 may be represented by e.g. a Central Processing Unit (CPU), a processor, a microprocessor, or other processing logic that may interpret and execute instructions. The processing unit 540 may perform all data processing functions for inputting, outputting, and processing of data including data buffering and device control functions, such as call processing control, user interface control, or the like.

It is to be noted that the described units 510-540 comprised within the arrangement 500 may be regarded as separate logical entities, but not with necessity as separate physical entities. Any, some or all of the units 510-540 may be comprised or co-arranged within the same physical unit. However, in order to facilitate the understanding of the functionality of the arrangement 500, the comprised units 510-540 are illustrated as separate units in FIG. 5.

Thus the communication unit 510 and e.g. the receiving unit 520 may, according to some embodiments, be comprised within one physical unit, a transceiver, which may comprise a transmitter circuit and a receiver circuit, which respectively transmits outgoing radio frequency signals to base station 15 and receives incoming radio frequency signals from the base station 15 via an optional antenna. The antenna may be an embedded antenna, a retractable antenna or any other arbitrary antenna without departing from the scope of the present arrangements. The radio frequency signals transmitted between the base station 15 and the user equipment 18 may comprise both traffic and control signals e.g., paging signals/messages for incoming calls, which may be used to establish and maintain a voice call communication with another party or to transmit and/or receive data, such as SMS, e-mail or MMS messages, etc.

Computer Program Product in the Base Station 15

The method steps 401-403 in the base station 15 may be implemented through one or more processor units 540 in the user equipment 18, together with computer program code for performing the functions of the present method steps 401-403. Thus a computer program product, comprising instructions for performing the method steps 401-403 in the base station 15 may schedule communication between the base station 15 and the user equipment 18 in a multi-carrier communication network system 100.

The computer program product mentioned above may be provided for instance in the form of a data carrier carrying computer program code for performing the method steps according to the present solution when being loaded into the processor unit 540. The data carrier may be e.g. a hard disk, a CD ROM disc, a memory stick, an optical storage device, a magnetic storage device or any other appropriate medium such as a disk or tape that can hold machine readable data. The computer program code can furthermore be provided as pure program code on a server and downloaded to the base station 15 remotely, e.g. over an Internet or an intranet connection.

Further, a computer program product comprising instructions for performing at least some of the method steps 401-403 may be used for implementing the previously described method in the base station 15 for scheduling communication between the base station 15 and the user equipment 18 in the multi-carrier communication network system 100, when the computer program product is run on the processing unit 540 comprised within the base station 15.

Figure 6:
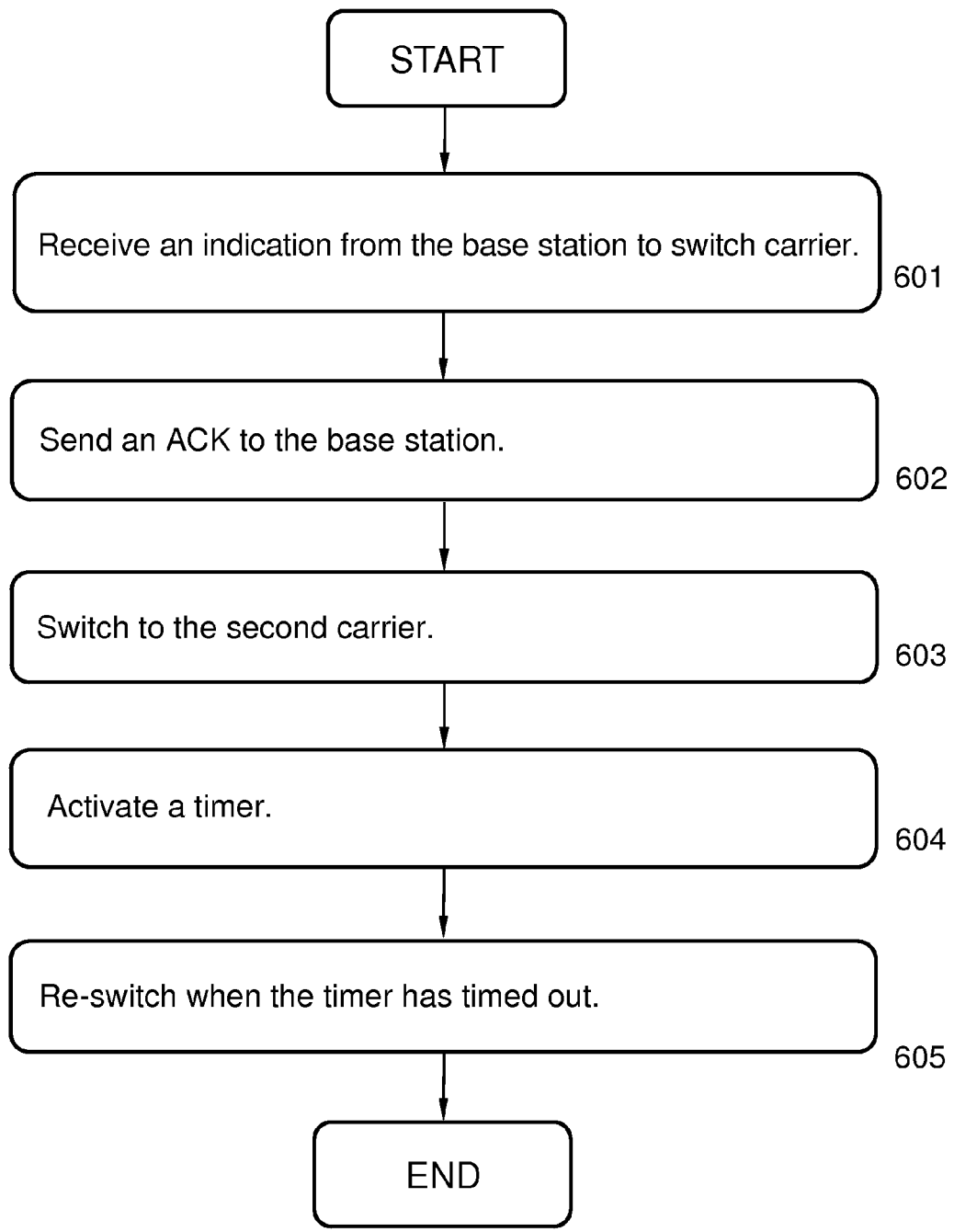
FIG. 6 is a flow chart illustrating embodiments of method steps in a user equipment.

FIG. 6 is a flow chart illustrating embodiments of method steps 601-605 performed in a user equipment 15. The method aims at assisting a base station 15 in scheduling communication between the base station 15 and a user equipment 18 in a multi-carrier communication network system 100. The base station 15 and the user equipment 18 are comprised in the multi-carrier communication network system 100. Further, the base station 15 and the user equipment 18 are adapted to communicate on a first downlink carrier 16-1 in a first frequency band 210 and on a second carrier 16-2, 17-1, 17-2 over a radio interface. According to some embodiments, the second carrier 16-2, 17-1, 17-2 may be a second downlink carrier 16-2 in a second frequency band 220. Alternatively, according to some embodiments, the second carrier 16-2, 17-1, 17-2 may be an uplink carrier 17-2 in the second frequency band 220, or an uplink carrier 17-1 in the first frequency band 210.

To appropriately schedule communication between the base station 15 and the user equipment 18, the method may comprise a number of method steps 601-605.

It is however to be noted that some of the described method steps 601-605 are optional and only comprised within some embodiments. Further, it is to be noted that the method steps 601-605 may be performed in a somewhat different chronological order and that some steps, or even all steps may be performed in an altered or rearranged chronological order. The method may comprise the following steps:

Step 601

An indication is received from the base station 15 on the first downlink carrier 16-1 in the first frequency band 210, on which the user equipment 18 currently is scheduled, to switch to the second carrier 16-2, 17-1, 17-2 in order to communicate data and/or control signalling on the second carrier 16-2, 17-1, 17-2.

Optionally, according to some embodiments, an indication may be received from the base station 15 on the first downlink carrier 16-1 in the first frequency band 210, on which the user equipment 18 currently is scheduled, to switch to the second downlink carrier 16-2 in the second frequency band 220 in order to receive data and/or control signalling on a downlink carrier on the second downlink carrier 16-2 in the second frequency band 220.

The indication may be received from the base station 15 by using a High Speed Shared Control Channel (HS-SCCH) order, according to some embodiments.

However, the indication may according to some embodiments be received from the base station 15 by using implicit signalling through a Transport Format Resource Combination (TFRC).

The indication received from the base station 15, to switch to the downlink carrier 16-2 in the second frequency band 220 may also comprise, according to some embodiments, an indication to switch to an uplink carrier 17-2 in the second frequency band 220.

According to some embodiments may the indication signalled to the user equipment 18, to switch to the second downlink carrier 16-2 in the second frequency band 220 be interpreted such that the uplink communication is also switched from the first uplink carrier 17-1 in the first frequency band 210 to the second uplink carrier 17-2 in the second frequency band 220.

Step 602

This step is optional and may only be performed within some embodiments.

An acknowledgement ACK may be sent to the base station 15 before any data and/or control signalling is communicated with the base station 15 on the second carrier 16-2, 17-1, 17-2.

Step 603

A switch is performed, to communicate data and/or control signalling on the second carrier 16-2, 17-1, 17-2.

According to some embodiments a switch may be performed, to receiving data and/or control signalling on the second downlink carrier 16-2 in the second frequency band 220.

Thereby, after the switch, all data and control signalling may be signalled on the second downlink carrier 16-2 in the second frequency band 220, while the first downlink carrier 16-1 in the first frequency band 210.

Step 604

This step is optional and may only be performed within some embodiments.

A timer 740 may be activated at the moment associated with the switching 603 from the first downlink carrier 16-1 in the first frequency band 210 to the second carrier 16-2, 17-1, 17-2.

Step 605

This step is optional and may only be performed within some embodiments.

A re switch may be performed from the second downlink carrier 16-2 in the second frequency band 220 to the first downlink carrier 16-1 in the first frequency band 210 when the timer 740 has timed out.

Figure 7:
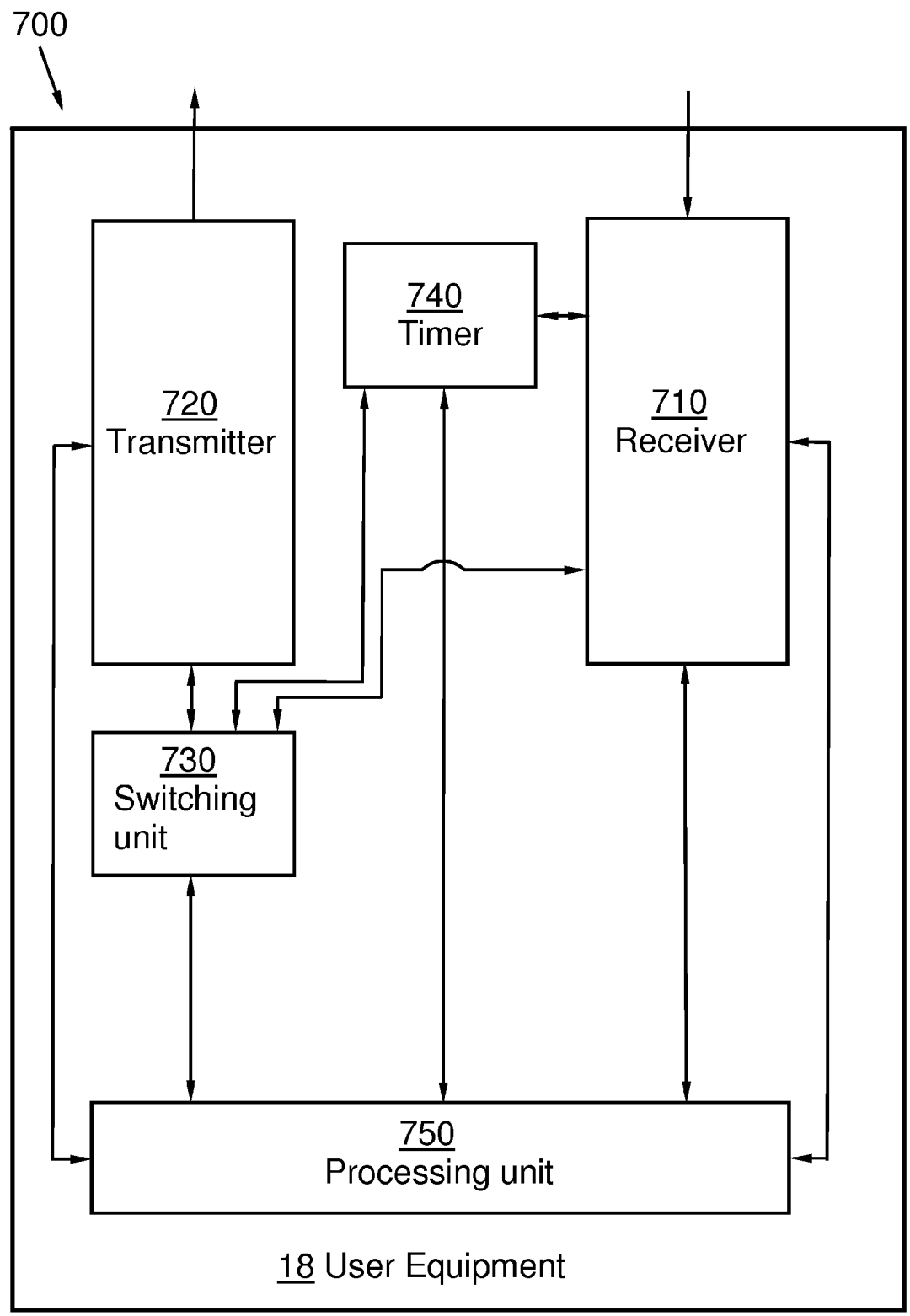
FIG. 7 is a block diagram illustrating embodiments of an arrangement in a user equipment.

FIG. 7 is a block diagram illustrating embodiments of an arrangement 700 situated in a user equipment 18. The arrangement 700 is configured to perform the method steps 601-605 for assisting a base station 15 in scheduling communication between the base station 15 and the user equipment 18 in a multi-carrier communication network system 100. The base station 15 and the user equipment 18 are comprised in the multi-carrier communication network system 100. The base station 15 and the user equipment 18 are adapted to communicate on a first downlink carrier 16-1 in a first frequency band 210 and on a second carrier 16-2, 17-1, 17-2 over a radio interface. According to some embodiments, the second carrier 16-2, 17-1, 17-2 may be a second downlink carrier 16-2 in a second frequency band 220. Alternatively, according to some embodiments, the second carrier 16-2, 17-1, 17-2 may be an uplink carrier 17-2 in the second frequency band 220, or an uplink carrier 17-1 in the first frequency band 210.

For the sake of clarity, any internal electronics of the arrangement 700, not completely necessary for understanding the present method has been omitted from FIG. 7.

The arrangement 700 comprises a receiving unit 710. The receiving unit 710 is adapted to receive an indication from the base station 15 on the first downlink carrier 16-1 in the first frequency band 210, which the user equipment 18 currently is scheduled on, to switch to the second carrier 16-2, 17-1, 17-2, in order to communicate data and/or control signalling on the second carrier 16-2, 17-1, 17-2. Further, the arrangement 700 comprises a switching unit 730. The switching unit 730 is adapted to switch to communicate over the second carrier 16-2, 17-1, 17-2.

The receiving unit 710 may according to some embodiments be adapted to receive an indication from the base station 15 on the first downlink carrier 16-1 in the first frequency band 210, which the user equipment 18 currently is scheduled on, to switch to the second downlink carrier 16-2 in the second frequency band 220, in order to receive data and/or control signalling on the second downlink carrier 16-2 in the second frequency band 220. Further, the arrangement 700 comprises a switching unit 730. The switching unit 730 is adapted to switch to communicate data and/or control signalling over the second carrier 16-2, 17-1, 17-2. According to some embodiments, the switching unit 730 may be adapted to switch to the second downlink carrier 16-2 in the second frequency band 220, in order to receive data and/or control signalling on the second downlink carrier 16-2 in the second frequency band 220.

Furthermore, according to some embodiments, the switching unit 730 may be adapted to switch from the first carrier 16-1, 17-1 e.g. a non-anchor carrier to the second carrier 16-2, 17-2 e.g. an anchor carrier, when an indication is received from the base station 15.

The arrangement 700 may optionally further comprise a sending unit 720. The sending unit 720 is adapted to send an ACK to the base station 15 before any downlink data and/or control signalling is received from the base station 15 on the second carrier 16-2, 17-1, 17-2, according to some embodiments.

Also, according to some embodiments, the arrangement 700 optionally may comprise a time offset suppressing timer 740. The optional timer 740 may be adapted to switch back from a first carrier 16-1, 17-1 e.g. a non-anchor carrier, to a second carrier 16-2, 17-2 e.g. an anchor carrier, when the timer 740 has timed out. The timer 740 may function as a count down timer, counting down from a specified time interval. According to some embodiments, the specified time interval may be preset to a predetermined and/or configured value. Alternatively, the timer value may be signalled from the base station 15, according to some embodiments.

The arrangement 700 may according to some embodiments further comprise a processing unit 750. The processing unit 750 may be represented by e.g. a Central Processing Unit (CPU), a processor, a microprocessor, or other processing logic that may interpret and execute instructions. The processing unit 750 may perform all data processing functions for inputting, outputting, and processing of data including data buffering and device control functions, such as call processing control, user interface control, or the like.

It is to be noted that the described units 710-750 comprised within the arrangement 700 may be regarded as separate logical entities, but not with necessity as separate physical entities. Any, some or all of the units 710-750 may be comprised or co-arranged within the same physical unit. However, in order to facilitate the understanding of the functionality of the arrangement 700, the comprised units 710-750 are illustrated as separate units in FIG. 7.

Thus the transmitting unit 720 and e.g. the receiving unit 710 may, according to some embodiments, be comprised within one physical unit, a transceiver, which may comprise a transmitter circuit and a receiver circuit, which respectively transmits outgoing radio frequency signals to the user equipment 18 and receives incoming radio frequency signals from the user equipment 18 via an optional antenna. The antenna may be an embedded antenna, a retractable antenna or any other arbitrary antenna without departing from the scope of the present arrangements. The radio frequency signals transmitted between the base station 15 and the user equipment 18 may comprise both traffic and control signals e.g., paging signals/messages for incoming calls, which may be used to establish and maintain a voice call communication with another party or to transmit and/or receive data, such as SMS, e-mail or MMS messages, etc.

Computer Program Product in the User Equipment 18

The method steps 601-605 in the user equipment 18 may be implemented through one or more processor units 750 in the user equipment 18, together with computer program code for performing the functions of the present method steps 601-605. Thus a computer program product, comprising instructions for performing the method steps 601-605 in the user equipment 18 may assist a base station 15 in scheduling communication between the base station 15 and a user equipment 18 in a multi-carrier communication network system 100.

The computer program product mentioned above may be provided for instance in the form of a data carrier carrying computer program code for performing the method steps according to the present solution when being loaded into the processor unit 750. The data carrier may be e.g. a hard disk, a CD ROM disc, a memory stick, an optical storage device, a magnetic storage device or any other appropriate medium such as a disk or tape that can hold machine readable data. The computer program code can furthermore be provided as pure program code on a server and downloaded to the user equipment 18 remotely, e.g. over an Internet or an intranet connection.

Further, a computer program product comprising instructions for performing at least some of the method steps 601-605 may be used for implementing the previously described method in the user equipment 18 for assisting a base station 15 in scheduling communication between the base station 15 and the user equipment 18 in the multi-carrier communication network system 100, when the computer program product is run on the processing unit 750 comprised within the user equipment 18.

Yet Some Particular Embodiments

According to a general embodiment of the present invention a procedure in a communication network node 15 for reducing power consumption of a user equipment 18 in a multi-carrier communication network system 100 is provided. The multi-carrier communication network system 100 comprises said communication network node 15, such as a radio base station. The communication network node 15 communicates with one or more user equipment 18 on downlink carriers 16-1, 16-2 and uplink carriers 17-1, 17-2 in at least two different frequency bands 210, 220 over a radio interface. The procedure comprises the step of: the communication network node 15 signalling an indication to the user equipment 18 on a downlink carrier 16-1, which the user equipment 18 currently is scheduled on, to switch to a downlink carrier 16-2 in a different band 220 to receive data and/or control signalling.

According to a general embodiment of the present invention a procedure in a user equipment 18 for reducing power consumption of the user equipment 18 in a multi-carrier communication network system 100 is provided. The multi-carrier communication network system 100 comprises a communication network node 15, such as a radio base station. The communication network node 15 communicates with one or more user equipment 18 on downlink carriers 16-1, 16-2 and uplink carriers 17-1, 17-2 in at least two different frequency bands 210, 220 over a radio interface. The procedure comprises the steps of: the user equipment 18 receiving signalling from the communication network node 15 with an indication on a downlink carrier 16-1, which the user equipment 15 currently is scheduled on, to switch to a downlink carrier 16-2 in a different frequency band 220 to receive data and/or control signalling. Also, the method comprises switching to the downlink carrier 16-2 in the different frequency band 220 and receiving data and/or control signalling.

According to a general embodiment of the present invention a communication network node 15 for reducing power consumption of a user equipment 18 in a multi-carrier communication network system 100 is provided. The multi-carrier communication network system 100 comprises said communication network node 15, such as a radio base station. The communication network node 15 communicates with one or more user equipment 18 on downlink carriers 16-1, 16-2 and uplink carriers 17-1, 17-2 in at least two different frequency bands 210, 220 over a radio interface. The communication network node 15 comprises a transmitter 510 or other communication means arranged to signal an indication to the user equipment 18 on a downlink carrier 16-1, which the user equipment 18 currently is scheduled on, to switch to a downlink carrier 16-2 in a different band 220 to receive data and/or control signalling.

According to a general embodiment of the present invention a user equipment 18 for reducing power consumption of the user equipment 18 in a multi-carrier communication network system 100 is provided. The multi-carrier communication network system 100 comprises a communication network node 15, such as a radio base station. The communication network node 15 communicates with one or more user equipment 18 on downlink carriers 16-1, 16-2 and uplink carriers 17-1, 17-2 in at least two different frequency bands 210, 220 over a radio interface. The user equipment 18 comprises a receiver 710 arranged to receive signalling from the communication network node 15 with an indication on a downlink carrier 16-1, which the user equipment 18 currently is scheduled on, to switch to a downlink carrier 16-2 in a different frequency band 220 to receive data and/or control signalling. Also, the user equipment 18 comprises a switching means 730 for switching to the downlink carrier 16-2 in the different frequency band 220, whereby said receiver is arranged to receive data and/or control signalling.

According to some embodiments of the present invention, the indication is signalled to the user equipment 18 by using an HS-SCCH order sent on a downlink anchor/non-anchor carrier 16-1, 16-2, depending on which downlink carrier 16-1, 16-2 the user equipment 18 is scheduled.

According to some embodiments of the present invention, the indication is signalled to the user equipment 18 by implicit signalling through the TFRC on the downlink anchor/non-anchor carrier 16-1, 16-2, depending on which downlink carrier 16-1, 16-2 the user equipment 18 is scheduled.

According to some embodiments of the present invention, the indication is signalled to the user equipment 18 by including a band switch command into the HS-SCCH on the downlink anchor/non-anchor carrier 16-1, 16-2, depending on which downlink carrier 16-1, 16-2 the user equipment 18 is scheduled.

According to some embodiments of the present invention, the user equipment 18 is arranged to automatically switch to an uplink carrier 17-1, 17-2 in a different frequency band 210, 220 when it switches the downlink carrier 16-1, 16-2.

According to some embodiments of the present invention, the indication is used to indicate a change of downlink anchor carrier 16-1, 16-2 and/or uplink anchor carrier 17-1, 17-2 such that the anchor carrier(s) always is/are in the received/transmitted frequency band 210, 220.

According to some embodiments of the present invention, the reception of the indication is acknowledged by the user equipment 18 by transmitting an ACK on HS-DPCCH on the uplink carrier 17-1, 17-2.

The terminology used in the detailed description of the particular exemplary embodiments illustrated in the accompanying drawings is not intended to be limiting of the invention.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The invention claimed is:

1. A method for controlling a user equipment in a multi-carrier communication network, the multi-carrier communication network comprising at least one base station, the user equipment comprising a radio interface adapted to communicate via a plurality of frequency bands, wherein the radio interface is configured with a first downlink carrier and with a first uplink carrier in a first frequency band and with a second downlink carrier and with a second uplink carrier in a second, different, frequency band, the method comprising causing the user equipment to:
   schedule the radio interface to receive data via the first downlink carrier and to transmit data via the first uplink carrier while maintaining association with both the first and the second downlink carriers and both the first and the second uplink carriers;
   monitor the first downlink carrier for a scheduling signal for the second downlink carrier and the second uplink carrier; and
   responsive to receipt of the scheduling signal, use the scheduling signal to cause the radio interface to receive data via the second downlink carrier and to transmit data via the second uplink carrier, and
   monitor for a further scheduling signal for the first downlink carrier and the first uplink carrier to cause the radio interface to receive data via the first downlink carrier and to transmit data via the first uplink carrier while maintaining an active communication connection with both the first and the second downlink carriers and both the first and the second uplink carriers to permit automatic switching between the first and the second downlink carriers and the first and the second uplink carriers.

2. The method according to claim 1, wherein the scheduling signal is received via a High Speed Shared Control Channel (HS-SCCH) order, or via a Transport Format Resource Combination (TFRC) signaling message.

3. The method according to claim 1, wherein the scheduling signal received by the user equipment is indicative of an instruction to transmit and receive data via the second frequency band.

4. The method according to claim 1, the method comprising sending an acknowledgement (ACK) before any downlink data is received via the second downlink carrier.

5. A user equipment configured to communicate in a multi-carrier communication network, the multi-carrier communication network comprising at least one base station, the user equipment comprising a radio interface adapted to communicate via a plurality of frequency bands, wherein the radio interface is configured with a first downlink carrier and with a first uplink carrier in a first frequency band and with a second downlink carrier and with a second uplink carrier in a second, different, frequency band, the user equipment comprising a processor and at least one memory, wherein the processor and the at least one memory are configured to cause the user equipment to at least:
   schedule the radio interface to receive data via the first downlink carrier and to transmit data via the first uplink carrier while maintaining association with both the first and the second downlink carriers and both the first and the second uplink carriers;
   monitor the first downlink carrier for a scheduling signal for the second downlink carrier and the second uplink carrier; and
   responsive to receipt of the scheduling signal, use the scheduling signal to cause the radio interface to receive data via the second downlink carrier and to transmit data via the second uplink carrier, and
   monitor for a further scheduling signal for the first downlink carrier and the first uplink carrier to cause the radio interface to receive data via the first downlink carrier and to transmit data via the first uplink carrier while maintaining an active communication connection with both the first and the second downlink carriers and both the first and the second uplink carriers to permit automatic switching between the first and the second downlink carriers and the first and the second uplink carriers.

6. The user equipment according to claim 5, wherein the scheduling signal is received via a High Speed Shared Control Channel (HS-SCCH) order, or via a Transport Format Resource Combination (TFRC) signaling message.

7. The user equipment according to claim 5, wherein the received scheduling signal is indicative of an instruction to transmit and receive data via the second frequency band.

8. The user equipment according to claim 5, wherein the processor and the at least one memory are configured to cause transmission of an acknowledgement (ACK) before any downlink data is received via the second downlink carrier.

9. A non-transitory computer-readable storage medium having computer-readable instructions stored thereon for controlling a user equipment in a multi-carrier communication network, the multi-carrier communication network comprising at least one base station, the user equipment comprising a radio interface adapted to communicate via a plurality of frequency bands, wherein the radio interface is configured with a first downlink carrier and with a first uplink carrier in a first frequency band and with a second downlink carrier and with a second uplink carrier in a second, different, frequency band, the computer-readable instructions, when executed by the user equipment, cause the user equipment to perform the steps of:

scheduling the radio interface to receive data via the first downlink carrier and to transmit data via the first uplink carrier while maintaining association with both the first and the second downlink carriers and both the first and the second uplink carriers;

monitoring the first downlink carrier for a scheduling signal for the second downlink carrier and the second uplink carrier; and responsive to receipt of the scheduling signal, using the scheduling signal to cause the radio interface to receive data via the second downlink carrier and to transmit data via the second uplink carrier, and monitoring for a further scheduling signal for the first downlink carrier and the first uplink carrier to cause the radio interface to receive data via the first downlink carrier and to transmit data via the first uplink carrier while maintaining an active communication connection with both the first and the second downlink carriers and both the first and the second uplink carriers to permit automatic switching between the first and the second downlink carriers and the first and the second uplink carriers.

* * * * *